US007349855B2

(12) United States Patent
Tetard

(10) Patent No.: US 7,349,855 B2
(45) Date of Patent: Mar. 25, 2008

(54) SYSTEM FOR STATISTICAL FOLLOW-UP OF POSTAL PRODUCTS

(75) Inventor: Claude Tetard, Saint-Remy-l'Honore (FR)

(73) Assignee: Neopost Industrie, Bagneux (FR)

( * ) Notice: Subject to any disclaimer, the term of this patent is extended or adjusted under 35 U.S.C. 154(b) by 713 days.

(21) Appl. No.: 10/287,471

(22) Filed: Nov. 5, 2002

(65) Prior Publication Data

US 2003/0088526 A1 May 8, 2003

(30) Foreign Application Priority Data

Nov. 7, 2001 (FR) .................................. 01 14374

(51) Int. Cl.
*G06Q 10/00* (2006.01)

(52) U.S. Cl. .......................... 705/1; 705/401; 705/404; 705/405

(58) Field of Classification Search ................ 705/401, 705/404, 405, 1
See application file for complete search history.

(56) References Cited

U.S. PATENT DOCUMENTS 4,931,943 A 6/1990 Vermesse
4,941,091 A 7/1990 Breault et al.
4,984,191 A * 1/1991 Vermesse .................... 705/410
5,383,115 A * 1/1995 Lecarpentier ............... 705/401
6,820,066 B1 * 11/2004 Reisinger et al. ........... 705/410

FOREIGN PATENT DOCUMENTS

EP 0717376 A2 * 6/1996
EP 0 992 947 4/2000
FR 2 685 522 6/1993

* cited by examiner

*Primary Examiner*—John W. Hayes
*Assistant Examiner*—Shannon Saliard
(74) *Attorney, Agent, or Firm*—Sughrue Mion, PLLC

(57) ABSTRACT

This invention relates to a device for statistically following up postal products for electronic franking system, comprising a random access memory (RAM) used for recording communication statements, in which a saved part of this RAM contains a plurality of communication counters each associated with a determined postal product and corresponding to the total number of postal products considered as priority or secondary by the Postal Service.

18 Claims, 2 Drawing Sheets

SYSTEM FOR STATISTICAL FOLLOW-UP OF POSTAL PRODUCTS

FIELD OF THE INVENTION

The present invention relates exclusively to electronic franking systems and concerns more particularly the statistical follow-up of postal products.

It is particularly applicable in electronic franking systems which are linked to a remote authorization centre in charge of monitoring and, in certain cases, reloading with funds the electronic franking systems linked thereto.

BACKGROUND OF THE INVENTION

Different devices for reloading electronic franking systems with funds from a remote authorization centre, ensuring that reloading of funds cannot be effected fraudulently or accidentally, already exist. Such a device is disclosed for example in French Patent No. 86 05588 and European Patent No. 0 207 492 which respectively describe an electronic security module and a smart card allowing the exchange of information by physical transport between an electronic franking system and an authorization centre, principally with a view to allowing the electronic system to be reloaded with funds.

In a variant described in French Patent No. 85 10081, the afore-mentioned module is replaced by a telephone line which allows this exchange of information in both directions without any physical displacement, such information being, of course, suitably encoded in order to avoid any error or fraud.

The secured module or the telephone line advantageously allow, on the one hand, the sending of directives from the remote authorization centre to the electronic franking systems and, on the other hand, the transfer of communication statements from a memory of the franking system towards the remote authorization centre. Such directives include in particular instructions defining the conditions of producing the communication statements intended to allow the Postal Service better to delimit operation of the electronic franking systems. It is known from the second document cited that such instructions concern the number, capacity and frequency (generally monthly) of the statements of communication counters located in the memory of an electronic franking system. The number of communication counters is in particular a function of the franking tariffs, each counter being associated with a range of franking values.

Now, the information obtained from these communication counters does not allow the Postal Service to reconstitute the postal traffic corresponding to the different electronic franking systems for a mode of dispatch or specific category of mail. This is why Applicants proposed in French Patent No. 91 15906 a device allowing a detailed breakdown as a function of a mode of dispatch or a specific category of mail, from the franking values alone.

This device for statistically following up the postal traffic which, in practice, gives satisfaction and, in addition, is sufficient to identify the various modes of dispatch or mail categories most currently used, proves to be inefficient when it is question of broadening such follow-up to all the postal products delivered by the Postal Service. Now, there are several hundreds of such products among which the Postal Service distinguishes postal products classified as “priority” (i.e. of which the Postal Service wishes to know the corresponding franking amounts regularly) from secondary postal products (in which the Postal Service is also interested, but to a lesser degree than the former ones).

The present invention has for its object to allow a statistical follow-up of the different postal products franked by a user of an electronic franking system whatever their number and by monitoring principally among these different postal products the follow-up of the so-called priority and secondary postal products.

SUMMARY OF THE INVENTION

This object is attained by a device for statistically following up postal products for an electronic franking system, comprising a random access memory (RAM) used for recording communication statements, characterized in that a saved part of this RAM contains a plurality of communication counters each associated with a postal product determined from a plurality of postal products accepted by the Postal Service.

Said plurality of communication counters advantageously corresponds to the total number of postal products considered as priority or secondary by the Postal Service.

Each communication counter preferably occupies at least three octets in the saved area of the RAM, at least one octet being allocated to the incrimination of the franking number, at least one octet being allocated to the incrementation of the franking amount and at the most one octet being allocated to a reference of said determined postal product associated with said communication counter. This reference of the determined postal product comprises an indication of the priority, secondary or simple nature of the postal product.

The postal products to be followed up are transmitted by the remote authorization centre to the electronic franking systems via a telephone line which links the remote authorization centre and the electronic franking systems.

Inversely, the values of the communication counters are transmitted by each electronic franking system to the remote authorization centre through the telephone line.

The communication counters and the list of the postal products to be followed up will preferably form part of the contents of the electronic messages exchanged between the remote authorization centre and the electronic franking systems at the moment of reloading these latter with funds. It is obvious that the followed up postal products, for an electronic franking system, may be modified at each exchange of information between the remote authorization centre and the electronic franking system.

The invention also relates to the process for statistically following up postal products for electronic franking system, in which each franked postal product is successively recorded (from a position 1 to n) in a saved part of a RAM of the franking system, a determined postal product being associated with a determined memory register of this saved part of RAM, and in which, when the maximum recording capacity of the RAM is attained (recorded position n), a postal product not yet recorded cannot be memorized at a location of a postal product already recorded, unless it belongs to a category predetermined by the Postal Service. According to the form of embodiment envisaged, the fresh recorded postal product is memorized at the location of a postal product not belonging to said predetermined category and of which a franking number is the lowest or of which the position of recording i is the lowermost.

In a variant embodiment, when the maximum recording capacity of the RAM is attained (recorded position n), the saved part of the RAM is unloaded towards a remote authorization centre to which the electronic franking system is linked.

BRIEF DESCRIPTION OF THE DRAWINGS

The invention will be more readily understood on reading the following description given by way of non-limiting example, with reference to the accompanying drawings, in which.

DESCRIPTION OF PREFERRED EMBODIMENT

Figure 1:
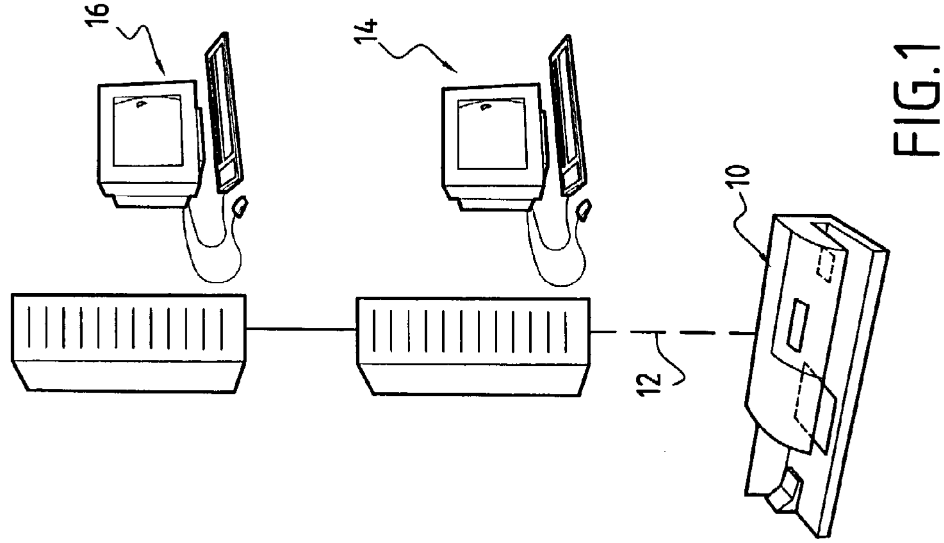
FIG. 1 shows an electronic franking system to which the device according to the invention for statistically following up postal products is applied.

Referring now to the drawings, FIG. 1 shows the present architecture of an electronic franking system with a franking machine 10 linked via a specialized telephone line 12 to a remote authorization data-processing centre 14, generally managed by the manufacturer or distributor of the franking machine, this first data-processing centre itself being linked to a second data-processing centre 16, in principle a server of the Postal Service. The exchanges of information between the franking machine 10 and the remote authorization centre 14 are, in principle, periodic, once a month for example.

Figure 2:
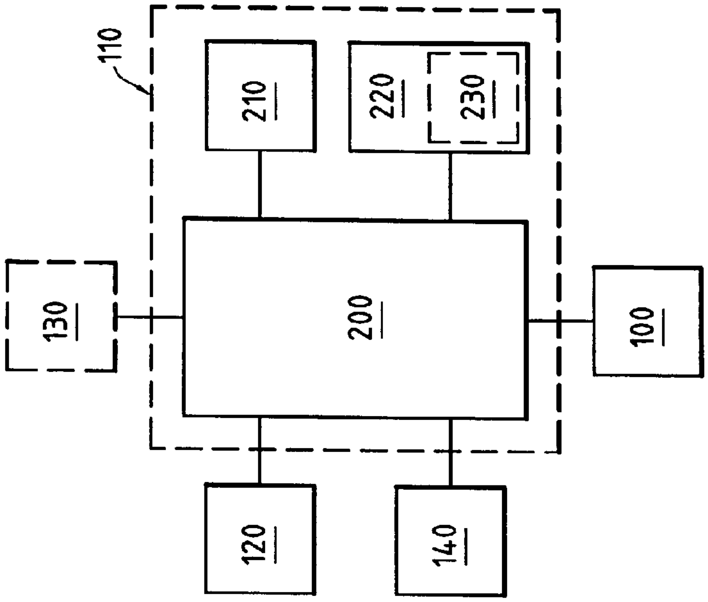
FIG. 2 schematically shows processing means of the electronic franking system of FIG. 1.

The internal electronic structure of a franking machine 10 is schematically illustrated in FIG. 2. It conventionally comprises a print module 100, preferably of ink jet type (but all other known print means can also be envisaged), controlled from an accounting and management device 110 which receives instructions such as the mode of dispatch or the franking amount from an integrated input member 120 (keyboard for example) or, for certain of them, an outside member (the remote authorization centre 14) via a communication interface 130. Choices of input options or accounts rendered may be displayed on an integrated monitoring screen 140.

The accounting and management device which is advantageously in the form of a secured electronic module, comprises a processing unit 200, a program ROM 210 and a data RAM 220.The program ROM comprises the instructions necessary for managing the frankings as well as certain fixed data relative to the user and inscribed when the machine is installed (different identification numbers or encoding keys for example). The data RAM contains the temporary data necessary for executing the afore-mentioned instructions and it further comprises a saved part 230 containing the information necessary for monitoring the frankings such as the franking cycle counter, the franking amount counters (also called ascending and descending registers) and the communication counters necessary for a better follow-up of the postal traffic.

In practice, the present accounting and management devices are provided, for a question of security (redundancy), with two stand-by RAMs (of flash type) which are identical but each having a limited maximum capacity only allowing the follow-up of a restricted number of communication counters.

Figure 3:
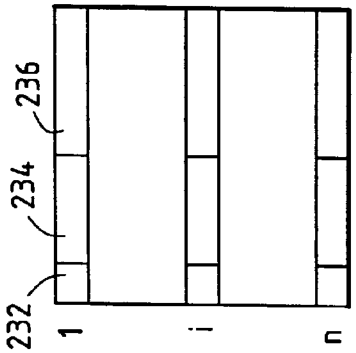
FIG. 3 illustrates the structure of a saved part of the RAM of the processing means of FIG. 2.

The saved part of the RAM comprising these communication counters is illustrated in FIG. 3.

According to the invention, this saved part 230 which comprises, by construction, a limited number of memory spaces or registers, is used for storing a plurality of communication counters each allocated to a postal product determined from among all the postal products accepted by the Postal Service. The number of communication counters preferably corresponds to the number of postal products particularly followed up by the Postal Service and qualified by it as priority or secondary. For example, this saved part may comprise 40 counters, of which 30 are allocated to priority postal products and 10 to secondary postal products.

Each communication counter associated with a determined postal product keeps account, by incrementation, of the number of franked envelopes and the amount of the frankings corresponding to these envelopes. Preferably, it occupies at least three octets in the saved area of the RAM, at least one octet (preferably three) being allocated to the accounting of the number of frankings and at least one octet (preferably four) being allocated to the amount of the frankings for the postal product concerned whose reference is coded on at the most a last octet.

By taking a block of M octets to install the communication counters, it is thus possible to define the maximum number of communication counters by the equation: maximum number of counters =M/8. Consequently, a block of only 320 octets is necessary for storing 40 communication counters.

The reference of the postal product integrates the priority, secondary or other character of the postal product. The priority or secondary nature of the postal product depends on different factors left to the discretion of the Postal Service, such as the tariff, the frequency of dispatch or the destination. For example, the following may be considered as priority postal product: rapid letter weighing less than 20 g addressed to a EU State, rapid letter of less than 50 g addressed to a EU State, registered letters of less than 20 g with registration rate R3, with and without acknowledgement of receipt, parcel of less than 2 kg addressed to a EU State. Similarly, the following may be considered as secondary postal product: rapid letter weighing less than 100 g addressed to a EU State, rapid letter of less than 20 g addressed to the DOM-TOMs (French Overseas Departments and Territories), registered letters of less than 20 g with registration rate R1, with and without acknowledgement of receipt, parcel of more than 30 kg addressed to Polynesia. All other postal products which are neither priority nor secondary are simple postal products for which the communication statements are of little importance for the Postal Service. However, this classification is evolutive and a simple postal product may become priority or secondary, in the same way as a secondary product may become priority, or vice versa.

The list of available postal products (and the list of corresponding tariffs) is transmitted by the franking centre to the electronic franking systems through the telephone line which links the authorization centre to the electronic franking systems. This list is evolutive as indicated hereinbefore and it is understood that the postal products may be periodically changed (every year for example) or not, at every exchange of information between the authorization centre and the electronic franking system for example (and preferably at the moment when funds are reloaded).

Inversely, the values of the communication counters are transmitted by each electronic franking system to the authorization centre through the telephone line at a periodicity defined by the Postal Service.

Figure 4:
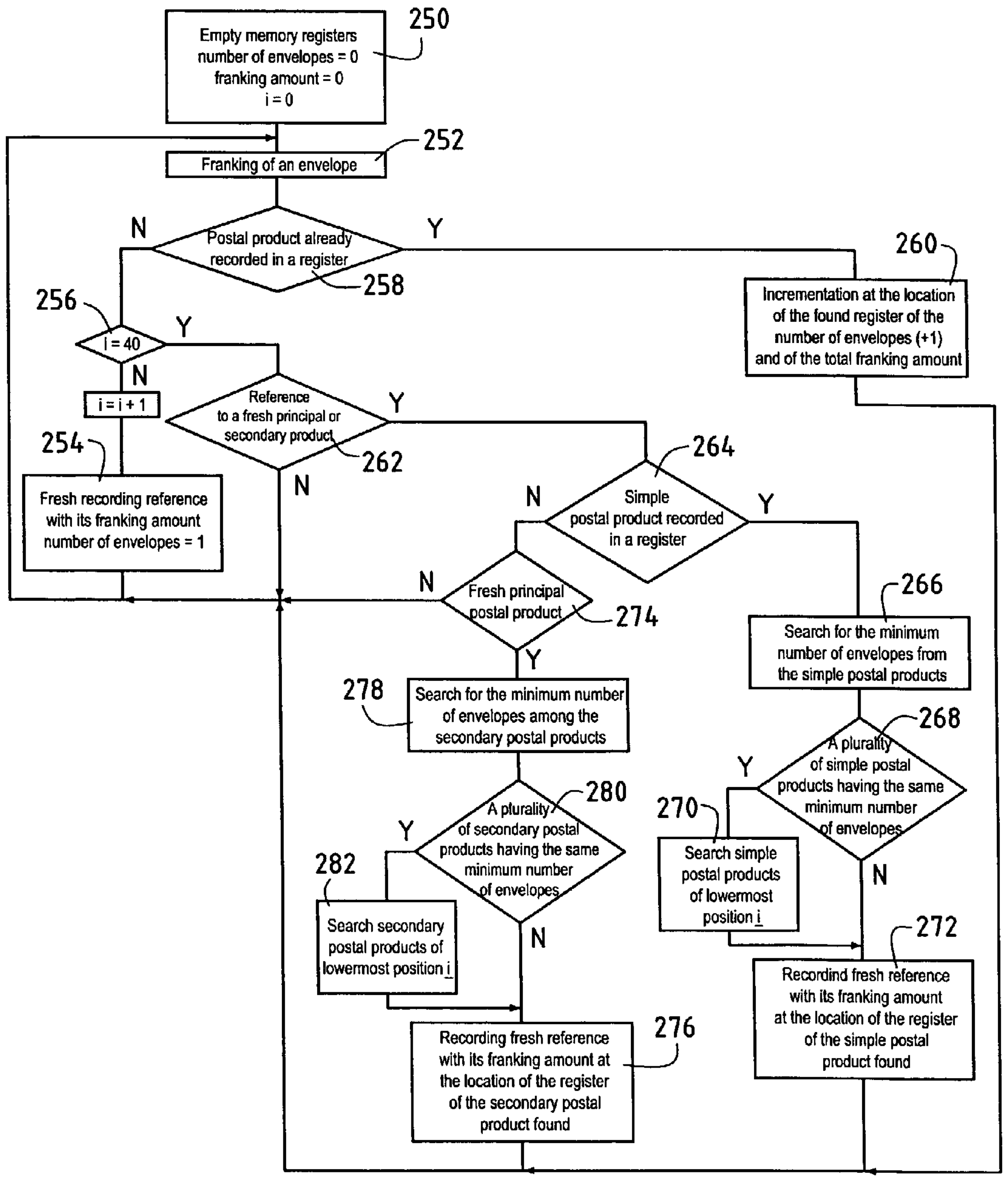
FIG. 4 is a flow chart illustrating the functioning of the statistical follow-up.

Functioning of the statistical follow-up will now be described with reference to FIG. 4. When the franking machine is installed, the saved part of the RAM is still blank and the 40 memory spaces or registers (corresponding to the number of postal products followed up by the Postal Service in the example chosen) are therefore each empty (the initialization step 250). When a first franking is effected during step 252, the information keyed in at the keyboard relative to the mode of dispatch (urgent, ordinary, registered, etc. . . . ), to the category of mail (parcel, letter weighing less than 20 g, etc.), and to the destination, allow the processing unit to determine the postal product selected by the user and of which the reference is then recorded with the franking amount respectively in the first, 232, and third, 236, areas of the first memory register. The number of envelopes recorded in the second area 234 is incremented by one unit and therefore equal to one (step 254).

This process of recording in the saved part of the RAM is then repeated for the following frankings (as long as the test of step 256 has not been effected) in the successive memory spaces or in the same one if the postal product corresponding to the fresh franking is identical to a preceding one already recorded (to that end, one proceeds in step 258 with a comparison in the processing unit of the fresh reference to be recorded with the references already memorized). In the latter case, the second memory area accounting the number of postal products is then incremented by one unit and the total franking amount increased by the amount of the fresh franking (step 260). When the 40 memory areas are occupied (reply YES to the test of step 256), which means that the maximum recording capacity of the memory is attained, and a fresh franking corresponding to a postal product not yet recorded is ready for recording, the processing unit determines whether the reference of the postal product to be recorded corresponds to that of a simple, secondary or priority postal product (test of step 262). If it is question of a simple postal product, it is not recorded in the saved part of the RAM and the corresponding information is therefore lost (reply NO to the test of step 262). If it is question of a principal or secondary postal product and simple postal products have been previously memorized (reply YES to the test of a following step 264), then the processing unit determines from among them in a step 266 the one whose franking number is the lowest (by comparison on areas 234) or in the case of equality (reply YES to the test of a following step 268) that of lowermost position i (i.e. the oldest in memory —step 270), and which will then be replaced by the fresh principal or secondary postal product keyed in (step 272). The information relative to the replaced simple postal product is then lost. In the extreme, if the user proceeds at least once with the franking of the 30 principal postal products and of the 10 secondary postal products defined previously by the Postal Service, no fresh franked simple, postal product can be recorded any more. On the contrary, by virtue of the particular importance given to priority postal products, if the Postal Service wishes to follow up a fresh priority postal product beyond the 30 already existing (reply YES to the test of a following step 274), the latter will necessarily replace in a step 276 a previously recorded secondary product (resulting from the search in a step 278), preferably the one whose franking number is the lowest (by comparison in a step 280 on the successive areas 234) or in the case of equality that of the lowermost recording position i (i.e. the oldest in memory—step 282).

It may be noted that, with the configuration set forth hereinabove, the information relative to certain simple postal products and even to secondary postal products (in the case of adding fresh principal products) is lost. Now, it may nonetheless be advantageous to save all this information. It is thus proposed in a variant embodiment to unload towards the remote authorization centre 14 the contents of the communication counters once the maximum recording capacity of the saved part of the RAM memory, for example 40 memory spaces in the example described, has been attained, whether the recorded postal products be priority or not. In this configuration, the link to the authorization centre will no longer be periodic, in particular monthly, but will be made each time that the saved part of the memory will have recorded 40 different postal products and will therefore prepare to record a fresh one.

The solutions set forth hereinabove present the advantage of being particularly versatile and of allowing all the postal products demanded by the Postal Service to be followed up and thus the elaboration of statistics to be facilitated. The saved area of the RAM is preferably accessible by a pointer which will reference a particular communication counter. In this respect, an electronic message which transits between the authorization centre and an electronic franking system will have a format comprising, besides the conventional octets dedicated to the identification information and that concerning the state of credit, a plurality of additional octets dedicated to the specific information relative to the communication counters.

The invention is very simple and economical to carry out and, with inexpensive modification, may be applied to electronic franking systems already in service.

What is claimed is:

1. A method for statistically following up postal products for an electronic franking system, the method comprising:

recording franking information of each of a plurality of franked postal products in a saved part of a random access memory (RAM) of the franking system, wherein franking information of each postal product is successively recorded in a separate memory location of the RAM upon being franked by the franking system, said RAM having a maximum recording capacity; and determining whether a postal product not yet recorded in the RAM belongs to at least one predetermined postal service category, wherein franking information of the postal product not yet recorded is prevented from being recorded in a memory location of the RAM storing a previously recorded postal product when the maximum recording capacity of the RAM has been attained unless the postal product not yet recorded is determined to belong to the at least one predetermined postal service category in which case the not yet recorded franking information is recorded in the RAM in place of previously recorded franking information.

2. The method of claim 1, wherein the postal product not yet recorded is recorded in the RAM as a newly recorded postal product at a memory location of the RAM storing a postal product not belonging to said predetermined category and of which a franking number is the lowest.

3. The method of claim 1, wherein the postal product not yet recorded is recorded in the RAM as a newly recorded postal product at a memory location of the RAM storing a postal product not belonging to said predetermined category and of which the position of recording is the lowermost.

4. The method of claim 1, wherein the franking information recorded for each of the plurality of franked postal products includes a postage amount and an indication of postal service category.

5. The method of claim 1, wherein the at least one predetermined postal service category is one of first class postage or second class postage, and the postal product not yet recorded in RAM is prevented from overwriting a memory location of the RAM storing a previously recorded postal product determined to belong to the predetermined postal service category.

6. The method of claim 1, wherein the at least one predetermined postal service category is one of first class postage and second class postage, and franking information of the postal product not yet recorded is written over a memory location of the RAM storing a previously recorded postal product determined not to belong to the predetermined postal service category.

7. The method of claim 6, wherein previously recording franking information of postal products that do not belong to the predetermined postal service category are overwritten such that a memory location storing franking information of a postal product having a lowest franking number is overwritten.

8. The method of claim 6, wherein the franking information of the postal product not yet recorded is written over the memory location of the RAM storing the previously recorded postal product determined not to belong to the predetermined postal service category if the previously recorded postal product belongs to a postal service category below second class postage.

9. A device for statistically following up postal products for an electronic franking system, the device comprising:

means for recording franking information of each of a plurality of franked postal products in a saved part of a random access memory (RAM) of the franking system, wherein franking information of each postal product is successively recorded in a separate memory location of the RAM upon being franked by the franking system, said RAM having a maximum recording capacity; and means for determining whether a postal product not yet recorded in the RAM belongs to at least one predetermined postal service category, wherein franking information of the postal product not yet recorded is prevented from being recorded in a memory location of the RAM storing a previously recorded postal product when the maximum recording capacity of the RAM has been attained unless the postal product not yet recorded is determined to belong to the at least one predetermined postal service category in which case the not yet recorded franking information is recorded in the RAM in place of previously recorded franking information.

10. The device of claim 9, wherein the postal product not yet recorded is recorded in the RAM as a newly recorded postal product at a memory location of the RAM storing a postal product not belonging to said predetermined category and of which a franking number is the lowest.

11. The device of claim 9, wherein the postal product not yet recorded is recorded in the RAM as a newly recorded postal product at a memory location of the RAM storing a postal product not belonging to said predetermined category and of which the position of recording is the lowermost.

12. The device of claim 9, wherein the franking information recorded for each of the plurality of franked postal products includes a postage amount and an indication of postal service category.

13. The device of claim 9, wherein the at least one predetermined postal service category is one of first class postage or second class postage, and the postal product not yet recorded in RAM is prevented from overwriting a memory location of the RAM storing a previously recorded postal product determined to belong to the predetermined postal service category.

14. The device of claim 9, wherein the at least one predetermined postal service category is one of first class postage and second class postage, and franking information of the postal product not yet recorded is written over a memory location of the RAM storing a previously recorded postal product determined not to belong to the predetermined postal service category.

15. The device of claim 14, wherein previously recording franking information of postal products that do not belong to the predetermined postal service category are overwritten such that a memory location storing franking information of a postal product having a lowest franking number is overwritten.

16. The device of claim 14, wherein the franking information of the postal product not yet recorded is written over the memory location of the RAM storing the previously recorded postal product determined not to belong to the predetermined postal service category if the previously recorded postal product belongs to a postal service category below second class postage.

17. The device of claim 9, wherein a saved part of the RAM includes a plurality of communication counters each associated with a postal product determined from a plurality of postal products accepted by a postal service.

18. The device of claim 17, wherein a communication counter occupies at least three octets in the saved part of the RAM, at least one octet being allocated to an incrementation of a franking number, at least one octet being allocated to the incrementation of a franking amount and at the most one octet being allocated to a reference of said determined postal product associated with said communication counter.

* * * * *